(12) United States Patent
Torisawa et al.

(10) Patent No.: US 6,812,946 B2
(45) Date of Patent: Nov. 2, 2004

(54) IMAGE FORMING DEVICE

(75) Inventors: Nobuyuki Torisawa, Kanagawa (JP); Chisato Yamamoto, Kanagawa (JP); Hiroshi Nakahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/162,525

(22) Filed: Jun. 5, 2002

(65) Prior Publication Data
US 2002/0186294 A1 Dec. 12, 2002

(30) Foreign Application Priority Data

| | | |
|---|---|---|
| Jun. 6, 2001 | (JP) | 2001-170642 |
| Mar. 27, 2002 | (JP) | 2002-088832 |
| Mar. 28, 2002 | (JP) | 2002-092635 |
| May 31, 2002 | (JP) | 2002-159491 |

(51) Int. Cl.[7] ............................................. B41J 2/435
(52) U.S. Cl. ........................................................ 347/228
(58) Field of Search ................................. 347/139, 140, 347/228, 262, 264, 234, 248; 355/27; 399/152, 153; 396/2; 358/296; 271/242

(56) References Cited

U.S. PATENT DOCUMENTS

| | | | | |
|---|---|---|---|---|
| 4,678,178 A | * | 7/1987 | Akiyama et al. | 271/242 |
| 4,831,461 A | * | 5/1989 | Ohta et al. | 358/296 |
| 5,073,791 A | * | 12/1991 | Mouri et al. | 355/27 |
| 5,151,713 A | * | 9/1992 | Kawasaki et al. | 347/262 |
| 5,980,127 A |   | 11/1999 | Ogiwara | 396/575 |
| 6,049,674 A | * | 4/2000 | Yamamoto et al. | 396/2 |

FOREIGN PATENT DOCUMENTS

| | | | | |
|---|---|---|---|---|
| EP | 0 971 265 A1 | 1/2000 | | |
| JP | 04172437 A | * 6/1992 | ........... G03B/27/14 |
| JP | 11-133572 | 5/1999 | | |
| JP | 11-167170 | 6/1999 | | |
| JP | 11-202419 | 7/1999 | | |
| JP | 11-228000 | 8/1999 | | |
| JP | 2000-122257 | 4/2000 | | |

* cited by examiner

Primary Examiner—Hai Pham
(74) Attorney, Agent, or Firm—Sughrue Mion, PLLC

(57) ABSTRACT

An image forming device in which, even if exposure processing and developing processing are carried out simultaneously, offset at a time of scanning-exposure in an exposure section, which is caused by relatively rough conveying in a developing section, can be eliminated. Attention is focused on rigidity of a sheet-shaped recording material. A guide plate of a conveying section is bent such that elastic repulsion is generated, and a predetermined frictional force with respect to a driving roller is generated by the elastic repulsion. Thus, even if the driving roller vibrates due to an external disturbance or non-uniform driving occurs, vibration or the like can be absorbed by movement of the recording material in a thickness direction thereof. Thus, conveying of the recording material is not directly affected, and conveying can be stabilized. Therefore, the developing section and the exposure section can be disposed near one another, and in particular, a time required until a first print is obtained can be shortened.

20 Claims, 15 Drawing Sheets

IMAGE FORMING DEVICE

BACKGROUND OF THE INVENTION

1. Field of the Invention

The present invention relates to an image forming device which, while conveying a sheet-shaped recording material, scan-exposes the recording material by a laser beam or the like, and subjects the recording material to developing processing.

2. Description of the Related Art

In recent years, in image forming devices such as heat developing recording devices, silver salt photographic exposing/developing devices and the like, a sheet-shaped recording material is exposed by a laser such that a latent image is formed thereon. The recording material is then subjected to dry or wet developing processing such that an image is formed thereon (see, for example, Japanese Patent Application Laid-Open (JP-A) Nos. 11-133572, 11-167170, 11-202419, 11-228000, and 2000-122257).

Such devices employ a system in which the recording material is exposed while being conveyed. However, there are cases in which, due to the recording material being conveyed in a skewed manner or irregular conveying of the recording material or the like, exposure cannot be carried out uniformly, and a good image cannot be obtained. Further, there is the concern that, because the exposure section and the developing section are disposed adjacent to each other, image defects will arise at the time of exposure because of the effects of the heat. There is also the need to avoid the problem of double exposure inherent in laser exposure.

SUMMARY OF THE INVENTION

An object of the present invention is to overcome the above-described problems.

In order to achieve the above object, in accordance with a first aspect of the present invention, there is provided an image forming device comprising: an exposure section having a laser irradiating device which irradiates and scans, on a sheet-shaped recording material, laser light which has been modulated on the basis of image data, and an exposing/conveying device for conveying the recording material, and scanning by the laser irradiating device is main scanning and conveying by the exposing/conveying device is subscanning, and the exposure section records an image by the main scanning and the subscanning; a heat developing section having an insertion portion, and conveying and heat developing the recording material on which an image has been formed, and wherein a path length between a scanning position and the insertion portion is shorter than a conveying direction length of the recording material, and wherein given that a conveying speed in the exposure section is V1 and a conveying speed in the heat developing section is V2, a relationship $0.7 < V2/V1 \leq 1.0$ is satisfied.

DESCRIPTION OF THE PREFERRED EMBODIMENTS

First Embodiment

Figure 1:
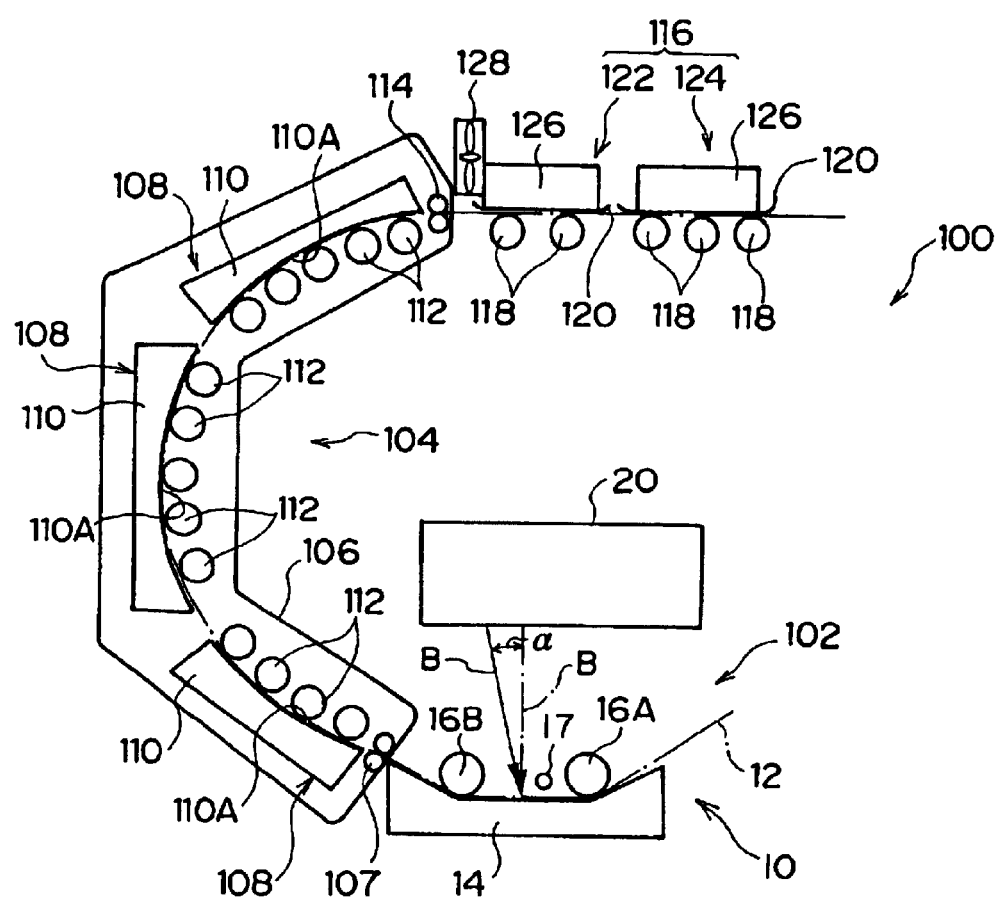
FIG. 1 is a schematic structural view of an image forming device relating to a first embodiment.

The schematic structure of an image forming device 100 relating to a first embodiment is shown in FIG. 1.

At the image forming device 100, sheet-shaped recording materials 12 are pulled out one-by-one from a recording material stocker (not shown), and are fed-into an exposure section 102. The exposure section 102 is formed by a conveying section 10 which conveying the sheet-shaped recording material 12, and a scanning section 20 which irradiates, toward the conveying section 10, laser light which is modulated on the basis of image data.

Figure 2:
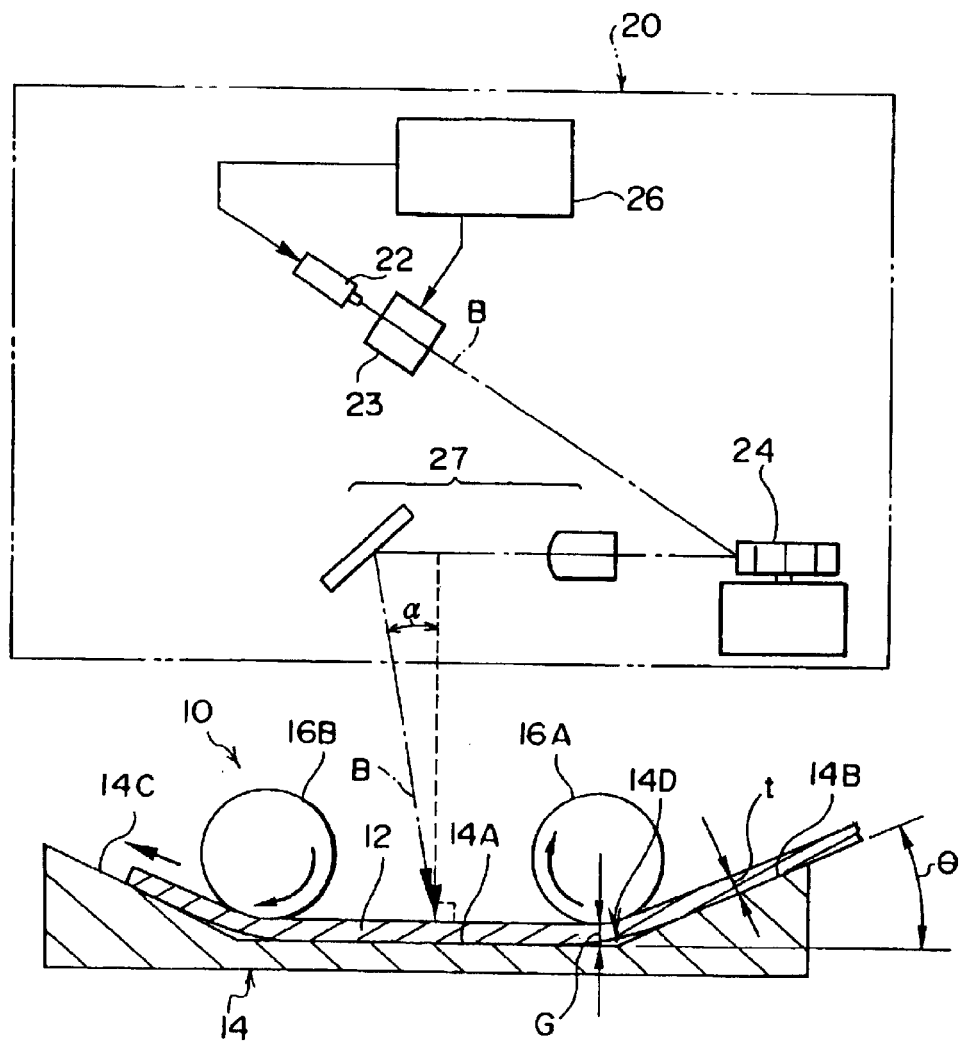
FIG. 2 is a schematic structural view of a conveying section and an image exposure section relating to the first embodiment.

Next, the structure of the conveying section 10 will be described with reference to FIG. 2. The conveying section 10 for conveying the sheet-shaped recording material 12 and the scanning section 20 (details of which will be described later), in the exposure section 102, are shown in FIG. 2.

The conveying section 10 has a guide plate 14 supporting the recording material 12. Note that, in the present first embodiment, the non-recording surface of the sheet-shaped recording material 12 faces the guide plate 14.

The guide plate 14 is formed such that a central portion, with respect to the conveying direction of the sheet-shaped recording material 12, of the guide plate 14 is a substantially horizontal surface 14A, and at least a conveying direction upstream side end portion of the guide plate 14 is bent so as to form a slope 14B. The slope 14B is inclined at an angle θ with respect to the horizontal surface 14A. A slope 14C, which has the same form as that of the slope 14B, is formed at the sheet-shaped recording material 12 conveying direction downstream side of the guide plate 14. The angle of inclination θ of the slope 14B (14C) is set to be greater than 0° and less than or equal to 45°.

The conveying path of the sheet-shaped recording material 12 is such that the sheet-shaped recording material 12 enters in so as to slide down the slope 14B, and passes along the horizontal surface 14A. A driving roller 16A, which is provided so as to correspond to the guide plate 14, provides this conveying force.

The driving roller 16A receives, via a transmitting means such as gears or belts or the like, driving force from an unillustrated driving means such as a motor or the like, and rotates clockwise in FIG. 2. A driving roller 16B having the same structure as the driving roller 16A is provided, for discharging the sheet-shaped recording material, at a position which is the boundary between the slope 14C and the horizontal surface 14A. Hereinafter, explanation will be given by using the driving roller 16A as an example, and explanation of the driving roller 16B will be omitted.

The driving roller 16A is disposed so as to oppose a bent portion 14D which is the boundary between the horizontal surface 14A and the slope 14B.

Figure 3:
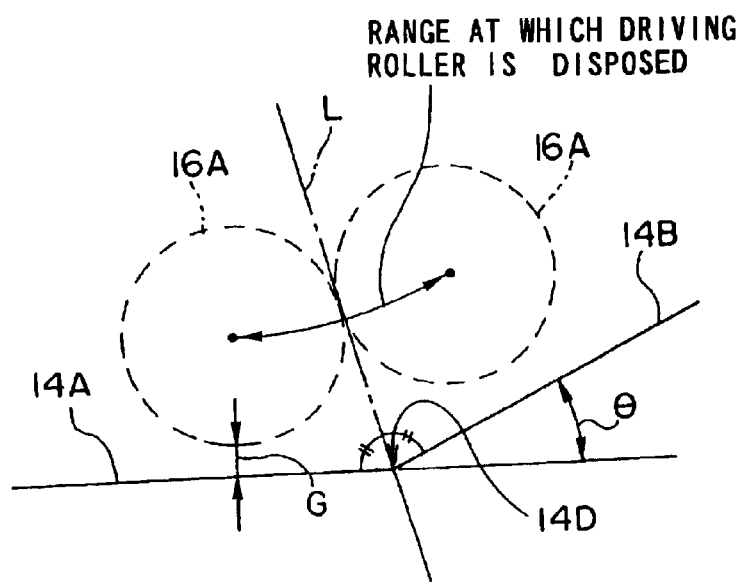
FIG. 3 is an enlarged view showing a relative positional relationship between a guide plate and a driving roller.

The position at which the driving roller 16A is disposed with respect to the guide plate 14 is preferably a range in which, as seen from the side as shown in FIG. 3, the outer periphery of the driving roller 16A contacts a straight line L which passes through the bent portion 14D (the point where the angle changes) of the guide plate 14 and which bisects the inner angle (180°-θ) of the guide plate 14. Note that the relationship between the diameter of the driving roller 16A and the length of the guide plate 14 is not limited to a specific relationship.

Figure 4:
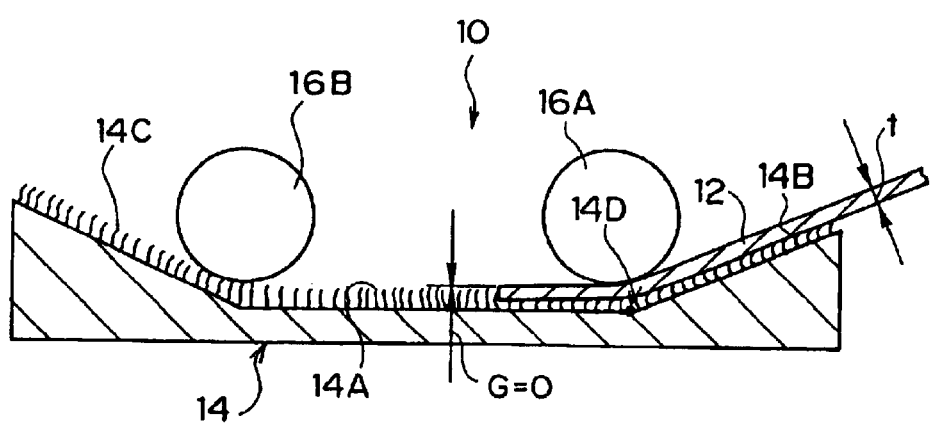
FIG. 4 is an enlarged view of a case in which a surface of the guide plate is covered by fibers.

A predetermined interval G is formed between the peripheral surface of the driving roller 16A and the guide plate 14. This interval G may be from equal to to 10 times a thickness t of the sheet-shaped recording material 12 (t≦G≦10t). When the guide plate 14 is used as a heat developing processing portion, the surface of the guide plate 14 is covered with fibers, and the provision of heat from the heated guide plate 14 to the sheet-shaped recording material can be adjusted to an optimal value. In this case, the interval formed between the peripheral surface of the driving roller 16A and the distal ends of the fibers may be apparently 0 (see FIG. 4), because the recording material pushes down the distal end portions of the fibers as the recording material is being conveyed.

In the above-described structure, when the sheet-shaped recording material 12 enters in from the leading end of the slope 14B, the sheet-shaped recording material 12 enters into the region between the guide plate 14 and the driving roller 16A. At this time, because the guide plate 14 is bent such that there is the predetermined angle θ between the horizontal surface 14A and the slope 14B, the sheet-shaped recording material 12 bends along the guide plate 14, and elastic repulsion of the sheet-shaped recording material 12 itself is generated. Due to this elastic repulsion, a predetermined frictional force arises between the sheet-shaped recording material 12 and the driving roller 16A, and the sheet-shaped recording material 12 is conveyed by the rotation of the driving roller 16A. Note that the coefficient of friction of the driving rollers 16A, 16B is greater than the coefficient of friction of the surface of the guide plate 14 which surface contacts the recording material.

The angle of inclination θ of the slope 14B (14C) depends on the rigidity of the sheet-shaped recording material. For example, because the rigidity of an imaging plate (IP) used in the FCR9000 (trade name of a product sold by Fuji Photo Film Co., Ltd.) or an aluminum plate which is a photosensitive lithographic printing plate, or the like is large, the angle of inclination θ is small. Because the rigidity of a heat recording material (using a film base) or a silver salt photographic photosensitive material (using a resin coated paper) or the like is small, the angle of inclination θ is large. The angle of inclination θ depends on the rigidity of the sheet-shaped recording material. In the case of a recording material for heat development (using a film base of a thickness of 175 μm), it suffices for the angle of inclination θ to be 10° to 30°, and for the interval G to be 1t to 5t.

Next, the structure of the scanning unit 20 will be described with reference to FIG. 2. The scanning unit (exposure section) 20 is disposed above the central portion, in the conveying direction of the sheet-shaped recording material 12, of the guide plate 14. The scanning unit 20 includes a semiconductor laser 22 and a modulating section 23. The semiconductor laser 22 is controlled by a control section 26 and irradiates laser light. The modulating section 23 modulates the laser light, which is irradiated from the semiconductor laser 22, in accordance with image signals from the control section 26. Laser light B is modulated by the modulating section 23 on the basis of image data. The laser light B outputted from the modulating section 23 is incident on the reflecting surfaces of a polygon mirror 24 rotating at high speed, and the reflected light is thereby scanned. The laser light B is guided, by optical members 27 such as an fθ lens and a cylindrical mirror and the like, to the sheet-shaped recording material 12 on the guide plate 14. Thus, the laser light is scanned (main scanned) onto the sheet-shaped recording material 12 in a direction orthogonal to the conveying direction, and further, the sheet-shaped recording material 12 is conveyed by the conveying section 10 (is sub-scanned). In this way, an image is exposed.

As can be seen in FIG. 1, laser light B is inclined by a predetermined angle (angle of incidence α) with respect to a vertical plane which is perpendicular to the recording material 12 when the recording material 12 is disposed between the driving rollers 16A and 16B.

As needed, an auxiliary roller 17, for pushing-in the recording material, may be provided between the driving rollers 16A and 16B.

Moreover, although the bent portion 14D is shown in the figures as being formed by the intersection of two planes, in actuality, the bent portion 14D is formed from a curved surface having a rounded cross-section. A radius (R) of the bent portion 14D and a diameter (Φ) of the driving rollers 16A and 16B satisfies the relationship 1 mm≦R≦Φ.

As shown in FIG. 1, a developing section 104 is disposed downstream of the exposure section 102. The developing section 104 is a dry-developing type section which carries out developing processing by heating the sheet-shaped recording material 12. The entire developing section 104 is covered by a casing 106. A roller pair 107, which serves as an introducing portion for the sheet-shaped recording material 12, is disposed at one end portion of the developing section 104. The region between the roller pair 107 and the final stage of the exposure section 102 (the conveying direction downstream side end portion of the guide plate 14) is a small dimension which is at least shorter than the conveying direction length of the sheet-shaped recording material 12.

As a result, the leading end of the sheet-shaped recording material 12, which is currently being scan-exposed in the exposure section 102, enters into the developing section 104.

Hereinafter, the structure of the developing section 104 will be described. The casing 106 of the developing section 104 has an arc-shaped path for the recording material 12. Three developing units 108 are disposed along this arc. Each developing unit 108 is formed by a heating plate 110 and a plurality of rollers 112. One surface of the heating plate 110 (the surface facing the sheet-shaped recording material 12) is formed as an arc-shaped heating surface 110A. The plurality of rollers 112, together with the heating surface 110A, nip the sheet-shaped recording material 12. The heating plates 110 are heated to predetermined temperatures by respective heating sources. As needed, the controlled temperatures of the heating plates 110 can be changed independently of one another. Further, the heat distribution within each developing unit 108 can be adjusted. Moreover, the rollers 112 receive driving force from respective driving means (not shown), and rotate at a uniform speed.

In this way, the sheet-shaped recording material 12, which is inserted from the insertion portion of the developing unit 108, is heated while being conveyed at a predetermined conveying speed. The sheet-shaped recording material 12 receives the amount of heat needed for development and is developed, up to the time when the sheet-shaped recording material 12 is nipped and discharged by a roller pair 114 provided at the discharging portion of the casing 106.

A cooling section 116 is disposed at the downstream side of the developing section 104.

Figure 5:
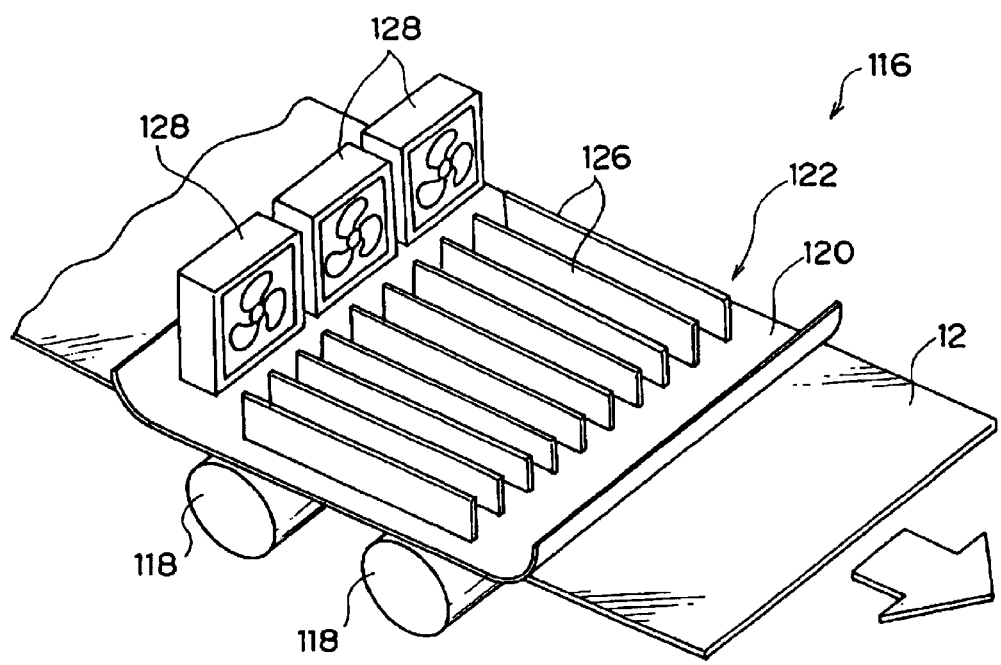
FIG. 5 is a perspective view of a cooling section.

Next, the structure of the cooling section 116 will be described with reference to FIG. 5. The cooling section 116 is formed by a plurality of cooling rollers 118 which support the sheet-shaped recording material 12, and cooling plates 120 which oppose the cooling rollers 118 and which contact the top surface side, in FIG. 5, of the sheet-shaped recording material 12. At least the surfaces of the cooling rollers 118 and the cooling plates 120 are formed of members, such as metal members or the like, having the property of being easy to heat and easy to cool. The cooling rollers 118 and the cooling plates 120 function to take away heat from the sheet-shaped recording material 12 by contacting the sheet-shaped recording material 12.

Thus, by passing through the cooling section 116, the sheet-shaped recording material 12 is cooled, and is then discharged.

Here, as shown in FIG. 1, the cooling section 116 is divided into a gradual cooling section 122, which is the earlier stage thereof, and a rapid cooling section 124, which is the latter stage thereof. The gradual cooling section 122 is a region in which the sheet-shaped recording material 12, which has just been developed and is a relatively high temperature (about 120° C.), is cooled gradually. By passing through the gradual cooling section 122, the temperature of the sheet-shaped recording material 12 is lowered to about 70° C. This is preferably a temperature which is lower than the glass transition point of the sheet-shaped recording material 12.

The rapid cooling section 124 is a region in which the temperature of the discharged sheet-shaped recording material 12 is lowered suddenly. Due to the sheet-shaped recording material 12 passing through the rapid cooling section 124, the temperature of the sheet-shaped recording material drops to about 45° C. This is a temperature which does not present problems for handling of the recording material by a worker.

Cooling fins 126 and air-cooling fans 128 are provided on the cooling plate 120 in the gradual cooling section 122. In this way, at the cooling plate 120, the heat dissipating effect is promoted by the cooling fins 126, and heat is forcibly dissipated by the air-cooling fans 128. Accordingly, the cooling plate 120 can substantially be maintained at its initial temperature. Further, when the sheet-shaped recording material 12 is not present at the cooling plate 120, the cooling plate 120 directly contacts the cooling rollers 118. Thus, the cooling rollers 118 as well can substantially be maintained at their initial temperatures.

Operation of the present first embodiment will be described hereinafter.

The sheet-shaped recording material 12 enters in from the end portion of the slope 14B (for example, in a state in which the non-recording surface of the sheet-shaped recording material 12 opposes the guide plate 14).

As the entry of the sheet-shaped recording material 12 proceeds, the sheet-shaped recording material 12 enters into the region between the guide plate 14 and the driving roller 16A. The driving roller 16A receives the driving force of a driving means via a transmitting means, and rotates clockwise in FIG. 1. The interval G between the driving roller 16A and the guide plate 14 is greater than or equal to the thickness of the sheet-shaped recording material 12 (i.e., the interval G is from t to 10t). Thus, there are cases in which it is difficult for the driving force of the driving roller 16A to be transmitted to the sheet-shaped recording material 12. There are cases in which this is not preferable from the standpoint of efficiency of conveying, but vibration or the like of the driving roller 16A, which is due to an external disturbance at this point in time, does not affect the conveying of the sheet-shaped recording material 12.

Here, the guide plate 14 is bent such that the predetermined angle θ is formed between the horizontal surface 14A and the slope 14B. The driving roller 16A is disposed in a vicinity of the bent portion 14D. Therefore, when the sheet-shaped recording material 12 moves from the slope 14B to the horizontal surface 14A, the sheet-shaped recording material 12 bends, and due to this bending, elastic repulsion is generated at the sheet-shaped recording material 12 itself. Due to this elastic repulsion, a predetermined frictional force arises between the sheet-shaped recording material 12 and the driving roller 16A, the conveying driving force is reliably transmitted from the driving roller 16A to the sheet-shaped recording material 12, and the sheet-shaped recording material 12 is conveyed.

Further, when an external disturbance arises, it is absorbed by the elastic force (the displacement in the direction of thickness) of the sheet-shaped recording material and does not affect conveying.

Note that, in a case in which the slope 14C and the driving roller 16B exist at the left side in FIG. 1, the same effects as those described above are achieved at the time of discharging the sheet-shaped recording material 12 from the guide plate 14. Namely, a predetermined frictional force between the sheet-shaped recording material 12 and the driving roller 16B arises due to the elastic repulsion due to the bending of the sheet-shaped recording material 12, and the sheet-shaped recording material 12 is reliably conveyed.

Laser light, which is modulated on the basis of image data, is scanned (main scanned) from the scanning unit 20 while the sheet-shaped recording material 12 is being conveyed. Thus, the conveying by the conveying section 10 is subscanning, and an image is exposed on the sheet-shaped recording material 12.

Further, while image exposure is continuing, the leading end portion of the sheet-shaped recording material 12 reaches the insertion portion of the developing section 104, and is nipped by the roller pair 107.

At this time, a shock occurs at the instant when the roller pair 107 nips the sheet-shaped recording material 12. This shock is the aforementioned external disturbance, and is transmitted to the roller 16A and the like of the conveying section 10. However, because the shock is absorbed by the elastic force (the displacement in the thickness direction) of the sheet-shaped recording material 12, the conveying is not affected.

The conveying system of the developing section 104 conveys the sheet-shaped recording material 12 relatively roughly, and there are cases in which non-uniform conveying of the sheet-shaped recording material 12 occurs. However, in the present first embodiment, non-uniform conveying, which may be caused by a source outside of the conveying section 10, can be absorbed at the conveying section 10. Thus, it is possible for the conveying section 10 and the developing section 104 to be disposed near one another, which was not possible in the conventional art.

Scanning by the scanning unit 20 and developing processing by the developing section 104 can be carried out simultaneously.

At the developing section 104, the sheet-shaped recording material 12 is conveyed in a substantial arc shape, is developed by being heated by the plural developing units 108, and is fed-out to the cooling section 116.

At the cooling section 116, first, the sheet-shaped recording material 12, which has been heated to 120° C., is cooled by the gradual cooling section 122 at a gradual rate to about 70° C. Thereafter, the sheet-shaped recording material 12 is rapidly cooled to about 45° C. by the rapid cooling section 124. In this way, the temperature of the sheet-shaped recording material 12 discharged from the cooling section 116 can be lowered to a temperature which does not cause problems for handling by a worker.

In this case, at the rapid cooling section 124 in particular, if the heat taken away from the sheet-shaped recording material 12 remains at the cooling plate 120 and the cooling rollers 118, the cooling effect deteriorates. However, in the present first embodiment, by providing the cooling fins 126 and the air-cooling fans 128, the cooling plate 120 and the cooling rollers 118 can always be maintained substantially at their initial temperatures, and a stable cooling effect can be maintained.

As described above, due to the elastic repulsion of the sheet-shaped recording material 12, a predetermined frictional force (a frictional force sufficient for the sheet-shaped recording material 12 to receive the driving force) is generated between the sheet-shaped recording material 12 and the driving roller 16A (16B). Thus, even if the driving roller 16A (16B) vibrates due to an external disturbance or the driving (rotational speed) thereof varies, the external disturbance can be absorbed by the sheet-shaped recording material 12 being displaced in the direction of thickness thereof, and the effects on conveying can be mitigated. Namely, stable conveying can be realized by a simple structure. Thus, the conveying section 10 (the position of scan-exposure) and the developing section 104 can be disposed close to one another, scan-exposure and developing processing can be carried out simultaneously on the same sheet-shaped recording material 12, and the time required until the first print is obtained can be shortened.

Figure 6:
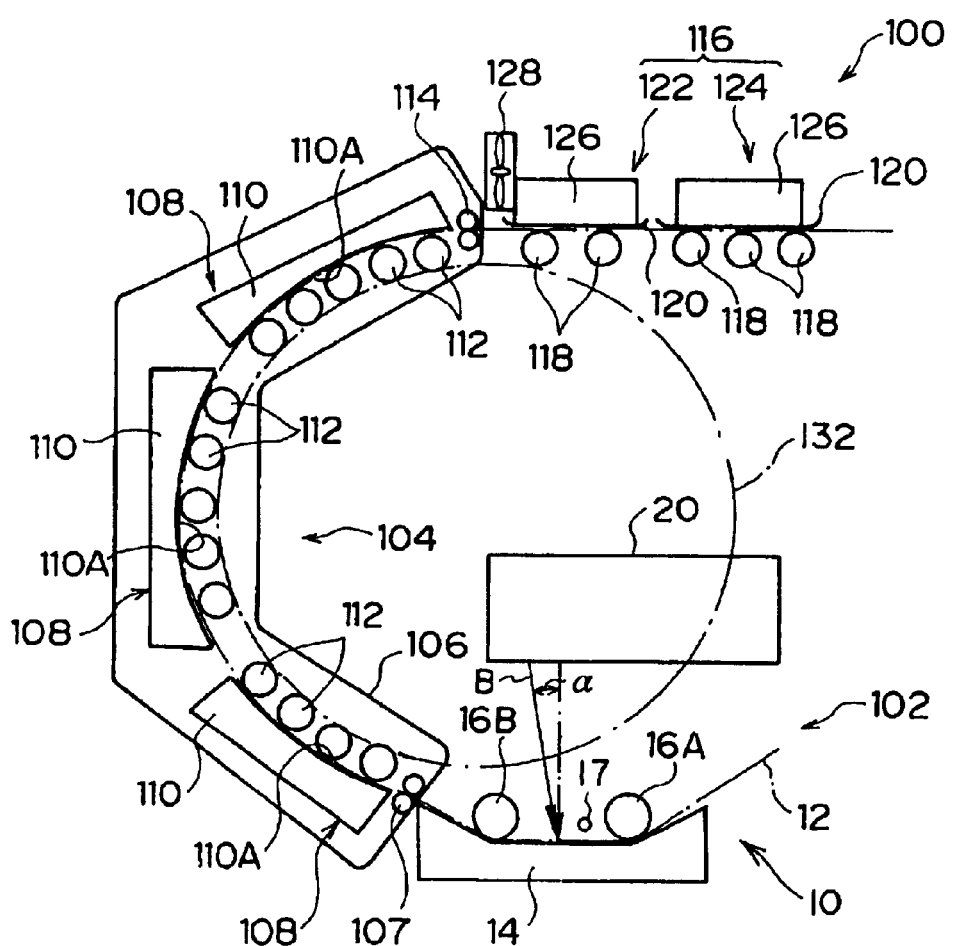
FIG. 6 is a schematic structural view of an image forming device relating to a modified example.

Note that, in the first embodiment, explanation is given with emphasis placed on disposing the conveying section 10 and the developing section 104 close to one another, and the relationship between the driving system of the conveying section 10 and the driving system of the developing section 104 is not shown. However, as shown in FIG. 6, by making the sheet-shaped recording material 12 conveying paths at the conveying section 10 and the developing section 104 substantially concentric, a single driving gear 132 can be made to correspond to all of the conveying rollers 112. Note that, in actuality, a plurality of gears and sprockets, or a belt or the like are disposed between the driving gear 132 and the conveying rollers 112. However, in FIG. 6, for convenience, gears (not shown), which are mounted coaxially to all of the rollers 112, mesh with the single gear 132.

In this way, a single driving system can be used in common for the driving system of the conveying section 10 and the driving system of the developing section 104. Namely, a structure is possible in which, even if vibration or the like generated at the developing section 104 is transmitted to the driving roller 16A of the conveying section 10, the vibration or the like is absorbed and can be prevented from being transmitted to the sheet-shaped recording material 12.

In the first embodiment, the sheet-shaped recording material 12 is supported by the guide plate 14. However, the up/down positional relationship of the guide plate 14 and the driving roller 16A may be reversed. Namely, because the sheet-shaped recording material 12 has a certain amount of rigidity, it is not necessary to always support the bottom surface thereof.

In the first embodiment, the standard for conveying the sheet-shaped recording material 12 is a horizontal surface. However, the standard for conveying the sheet-shaped recording material 12 may be a vertical surface, i.e., a surface inclined by 90° with respect to the states shown in FIGS. 1 through 3. (Namely, the horizontal surface 14A may be a vertical surface 14A.)

In the above-described first embodiment, attention is focused on the rigidity of the sheet-shaped recording material 12. The guide plate 14 of the conveying section 10 is bent, elastic repulsion is generated, and a predetermined frictional force with respect to the driving roller 16A (16B) is generated due to the elastic repulsion. Thus, even if, due to an external disturbance, the driving roller 16A (16B) vibrates or non-uniform driving occurs, the vibrations or the like are absorbed by the movement of the sheet-shaped recording material 12 in the thickness direction thereof. Thus, the conveying of the sheet-shaped recording material 12 is not directly affected, and conveying can be stabilized. Therefore, the developing section 104 can be disposed near the exposure section 102, and, in particular, the time until the first print is obtained can be shortened.

Second Embodiment

Hereinafter, a second embodiment of the present invention will be described with reference to FIG. 7. In the second embodiment, structural portions which are the same as those of the first embodiment are denoted by the same reference numerals, and description of the structures thereof is omitted.

Figure 7:
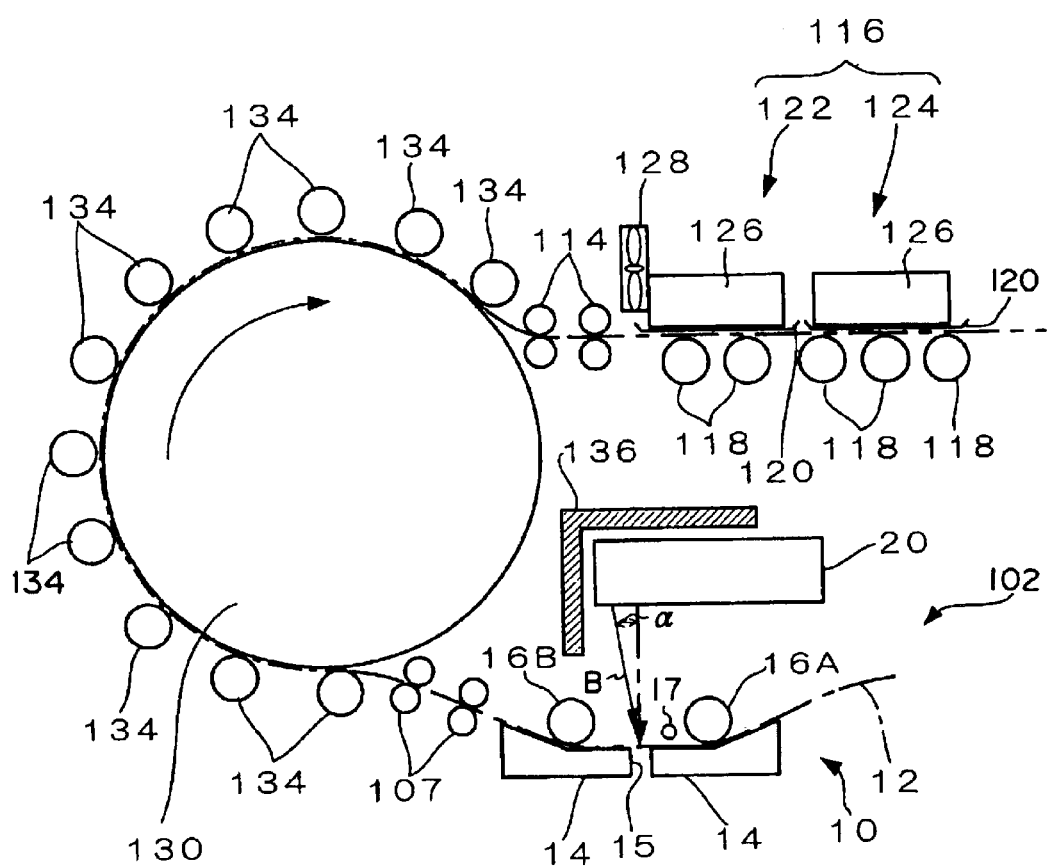
FIG. 7 is a schematic structural view of an image forming device relating to a second embodiment.

In the present second embodiment, as shown in FIG. 7, a slit hole 15 is provided along the main scanning direction at the position at which the laser light is irradiated from the scanning unit 20, at a conveying direction central portion of the horizontal surface 14A of the guide plate 14 which is the same as that of the first embodiment. The position of the slit hole 15 is the position at which the laser light is irradiated. As a result, the laser light passing through the sheet-shaped recording material 12 is allowed to escape to the exterior of the exposure section 102 (to the side beneath the guide plate 14). In this way, the laser light is not reflected by the horizontal surface 14A of the guide plate 14, and is not again irradiated onto the sheet-shaped recording material 12. Double exposure and fogging can thereby be prevented.

Further, a heat drum 130, which rotates in the direction of the arrow in FIG. 7, is provided at the developing section 104. A silicon rubber heater serving as a heat source is adhered to the inner side of the heat drum 130. The entire heat drum 130 is heated by the heat of the silicon rubber heater.

A plurality of rollers 134, which are driven by the rotation of the heat drum 130, are provided at the peripheral surface of the heat drum 130 around about ⅔ of the peripheral surface of the heat drum 130. The sheet-shaped recording material 12 is nipped by the heat drum 130 and the rollers 134, and is conveyed at a predetermined conveying speed along the peripheral surface of the heat drum 130 due to the rotation of the heat drum 130. Up to the time that the sheet-shaped recording material 12 is nipped and discharged by the roller pairs 114 provided at the discharging portion of the developing section 104, the sheet-shaped recording material 12 receives an amount of heat necessary for developing, and is developed.

A heat insulating material 136 is provided between the scanning unit 20 and the heat drum 130. When the heat drum 130 is used as the developing means, the entire heat drum 130 becomes hot. The heat insulating material 136 functions to mitigate the effects of the heat of the heat drum 130 on the scanning-exposure of the scanning unit 20.

As described above, in accordance with the image forming device of the present second embodiment, the slit 15 is provided at the guide plate 14 of the image forming device of the above-described first embodiment. Because the laser light, which has passed through the sheet-shaped recording material 12, is not reflected -by the guide plate 14, double exposure and fogging can be prevented.

Further, the heat insulating material 136 is provided between the scanning unit 20 and the heat drum 130. The heat of the heat drum 130 does not effect the scanning-exposure of the scanning unit 20.

Note that, in the present second embodiment, description is given of a case in which the rollers 134 are driven by the rotation of the heat drum 130. However, the rollers 134 can be driven in accordance with the linear velocity of the heat drum 130. At this time, because the sheet-shaped recording material 12 does not sag between the rollers 134, the linear velocity can be made to be slightly faster the more toward the downstream side, and a one-way clutch mechanism can be provided at the rollers 134.

In the same way as in the first embodiment, the cooling section 116 is structured as follows.

Namely, the cooling section is for cooling the sheet-shaped recording material after the sheet-shaped recording material has been developed by heat in the developing section. The cooling section is provided at the downstream side, in the conveying direction of the sheet-shaped recording material, of the developing section, and is formed by a gradual cooling section and a rapid cooling section. The gradual cooling section is the earlier stage of the cooling section, and cools the sheet-shaped recording material gradually. The rapid cooling section is the latter stage of the cooling section, and cools the sheet-shaped recording material quickly. Cooling members, for taking the heat from the recording material which has been heated by developing, are provided at the cooling section. The cooling section is provided with a temperature maintaining means for maintaining the temperature of the cooling members at their initial temperatures.

In accordance with the above-described structure, the sheet-shaped recording material can be cooled in a relatively short period of time. Further, the cooling section is a two-stage structure in which, after being cooled relatively gradually by the gradual cooling section, the sheet-shaped recording material is cooled quickly in the rapid cooling section. Thus, problems such as the sheet-shaped recording material deforming or condensation forming thereat, can be obviated. Moreover, the cooling members can be substantially maintained at their initial temperatures by the temperature maintaining means such as the cooling fins or the cooled-air fans or the like. Thus, stable cooling can be carried out, even if sheet-shaped recording materials are processed continuously.

As described above, the present invention has the excellent effect that, even if exposure processing and developing processing are carried out simultaneously, offset at the time of scanning-exposure at the exposure section, which is caused by relatively rough conveying in the developing section, can be eliminated.

Third Embodiment

Hereinafter, a third embodiment of the present invention will be described with reference to FIGS. 8 through 11.

Elements and portions which are the same as those of the first and second embodiments are denoted by the same reference numerals. Redundant explanation will be omitted when appropriate, and the characteristic portions of the present third embodiment will be described in detail.

The feature of the present third embodiment is that a guide portion 232 is provided between the conveying section 10 and the heat developing section 104.

Figure 9:
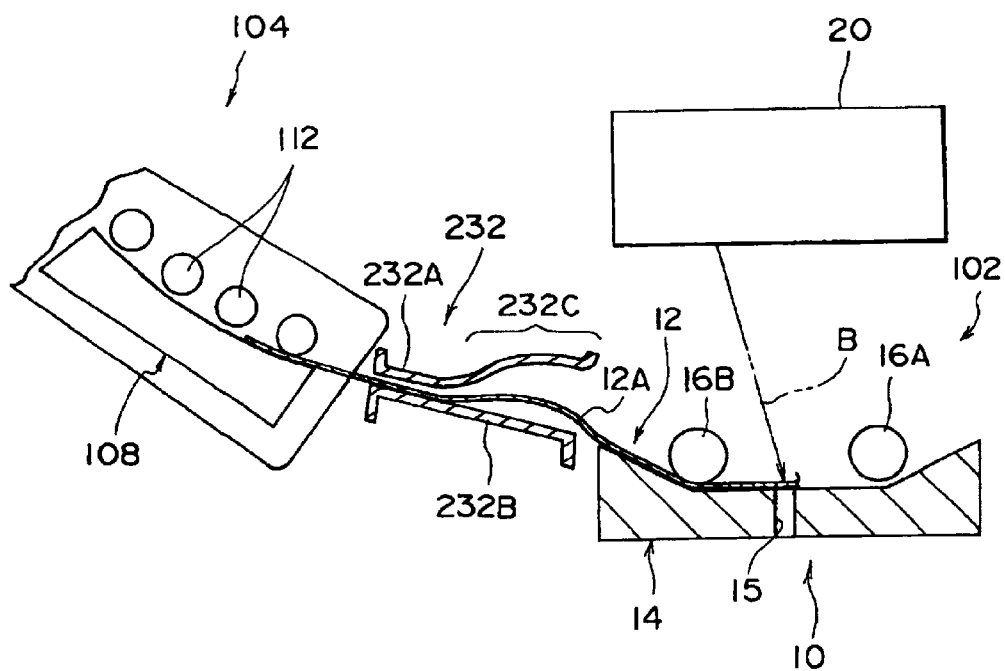
FIG. 9 is a diagram showing a region of connection between an exposure section and a developing section in the third embodiment.
Figure 10:
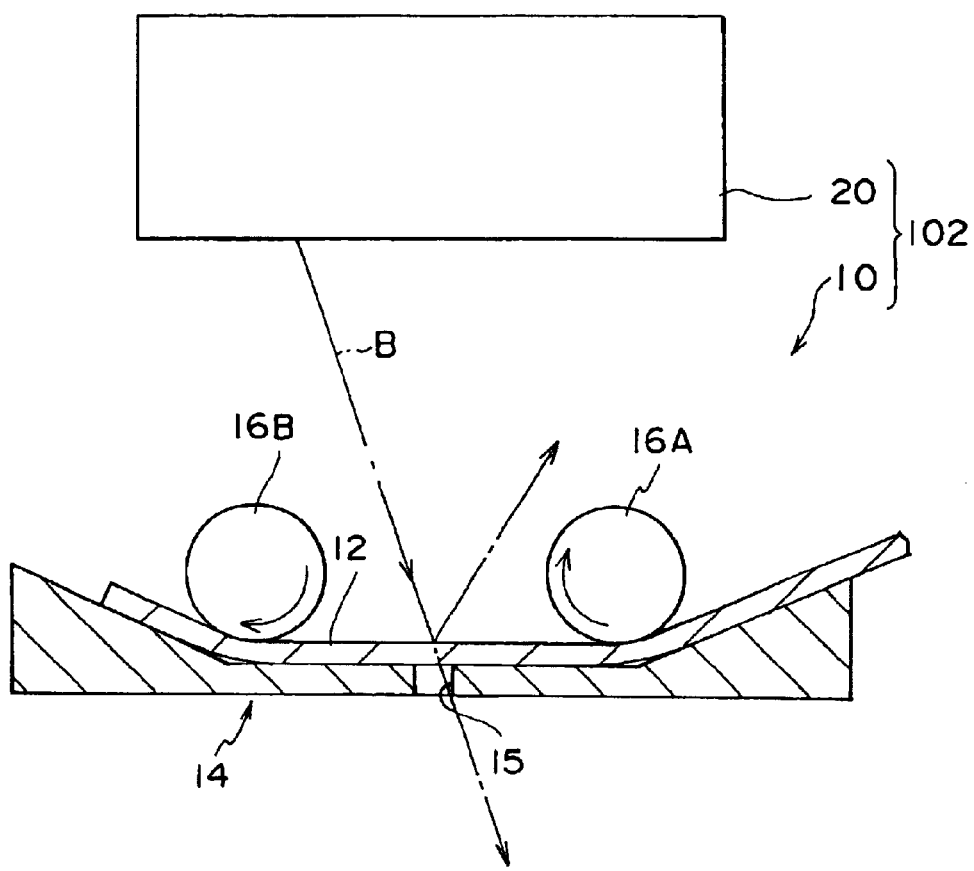
FIG. 10 is an enlarged diagram of a conveying section.
Figure 11:
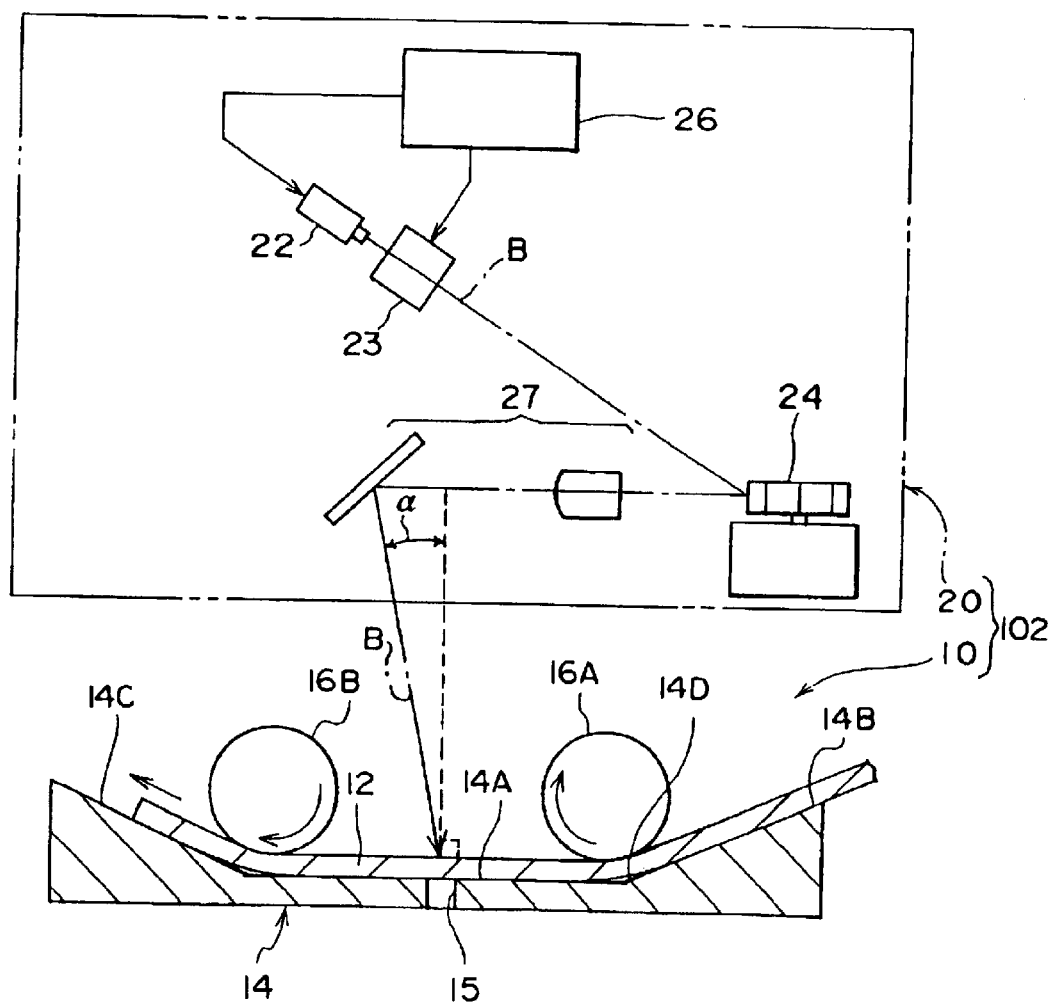
FIG. 11 is a schematic structural view showing the conveying section and a scanning section.

As shown in FIG. 9, the guide portion 232 has a guiding bottom plate 232B which is substantially flat-plate-shaped and supports the recording material 12, and a guiding upper plate 232A which is provided above the guiding bottom plate 232B so as to oppose the guiding bottom plate 232B.

The portion of the guiding upper plate 232A near the heat developing section 104 is parallel to the guiding bottom plate 232B. The portion of the guiding upper plate 232A, from the central portion thereof toward the conveying section 10, swells in a direction of moving away from the guiding bottom plate 232B such that the inner side cross-section thereof is a gradual, substantially circular arc shape.

This portion which swells is a swelled portion 232C which is a portion which prevents the recording surface 12A, which is the image writing surface of the recording material 12, from contacting the guiding upper plate 232A when the recording material 12 bends.

Note that the configuration of the guide portion 232 is not limited to the illustrated structure, and, for example, the inner side cross-sectional configuration of the guiding upper plate may be a uniform, substantially oval arc shape.

Due to the above structure, the bending of the recording material 12, which can arise due to the difference in the conveying speed at the conveying section 10 and the conveying speed at the heat developing section 104, is permissible at the inner side of the guiding upper plate 232A. Because the recording material is bent at the guide portion 232, irregular conveying at the heat developing section 104, which can arise due to the aforementioned difference in speeds, can be effectively absorbed.

Accordingly, the conveying speed of the conveying section 10 is not affected by irregular conveying caused by the difference in speeds. Therefore, it is difficult for the problem of image defects at the time of scanning-exposure due to irregular conveying, to arise. Further, because the swelling portion 232C is provided, the recording surface 12A of the recording material 12 can be prevented from being scratched due to contact with the inner side of the guiding upper plate 232A.

Given that the conveying speed of the recording material 12 is the conveying section 10 is V1 and the conveying speed in the heat developing section 104 is V2, it is preferable that, approximately, $0.7 < V2/V1 \leq 1.0$. It is more preferable that, approximately, $0.97 < V2/V1 \leq 0.99$. By setting the conveying speeds within this range, the amount of bending of the recording material 12 can be made to be within an appropriate range. Note that the reason why V2/V1 is not greater than 1.0 is that there is the concern that the recording material 12 will be excessively pulled by the heat developing section 104, and image defects will arise at the time of image writing.

As described above, in the present third embodiment, exposure processing and heat developing processing can be carried out simultaneously on the same one recording material 12. Further, problems caused by a difference in speeds between the conveying speed in the conveying section 10 and the conveying speed in the heat developing section 104 can be avoided. Therefore, the operations of the device are extremely stable, and the time required for printing can be shortened greatly.

Figure 8:
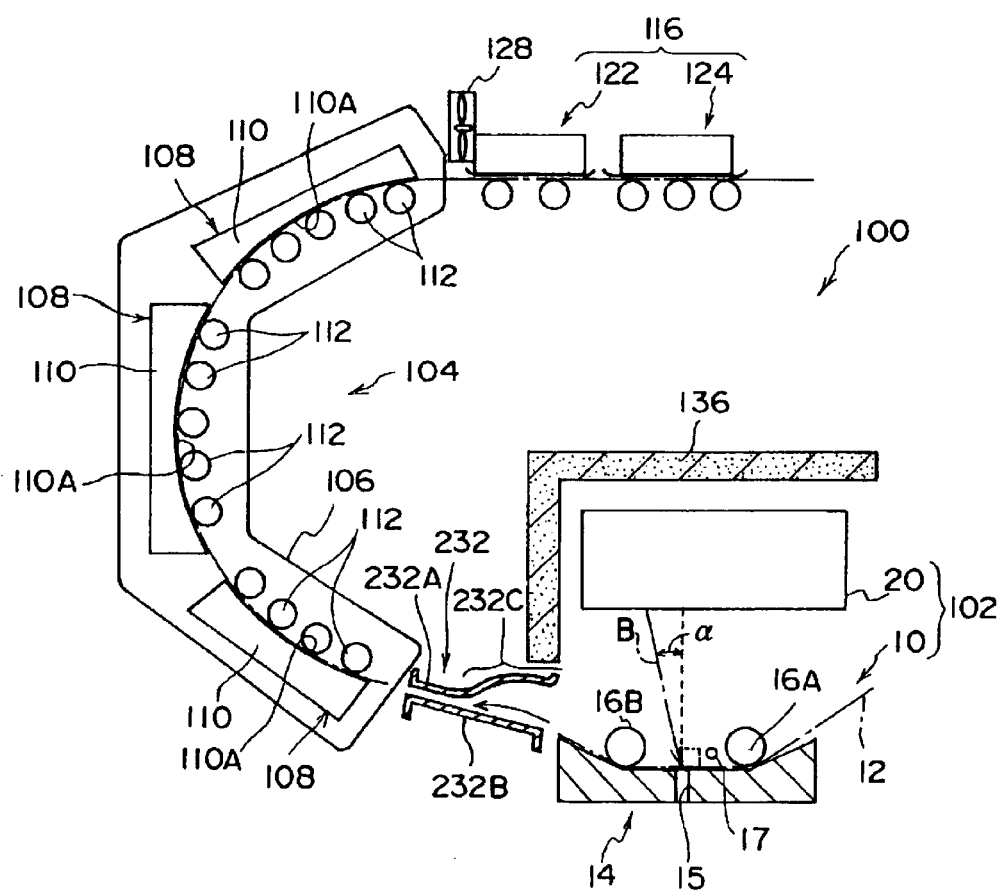
FIG. 8 is a schematic structural view of an image forming device relating to a third embodiment.

As shown in FIG. 8, the heat insulating material 136, which is provided between the heat developing section 104 and the scanning section 20, has a substantially L-shaped configuration as seen in cross-section, so as to cover the scanning section 20. Further, the heat insulating material 136 is adhered to a plate (not shown) which separates the heat developing section 104 and the scanning section 20. However, for example, a structure can be used in which the heat insulating material is sandwiched between plate members. Or, a structure can be used in which the heat insulating material is formed in a substantially circular arc shape as seen in cross-section, so as to cover the scanning section.

A heat-resistant, foamed resin (e.g., a melamine resin) or the like may be used as the material of the heat insulating material 136. Or, for example, glass fibers, a cork material, FRP, or the like, may be used as the material of the heat insulating material 136.

Figure 12:
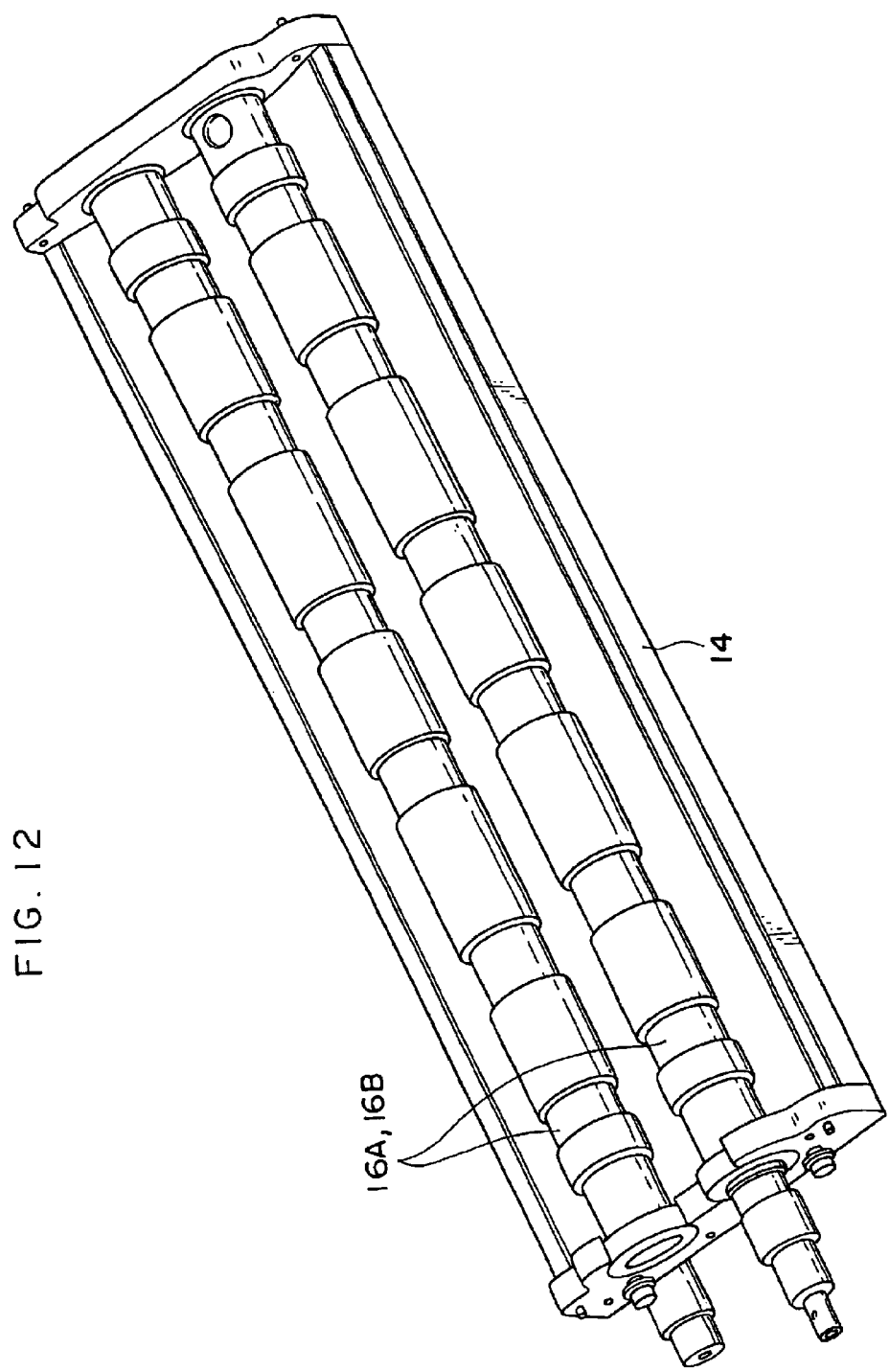
FIG. 12 is an overall perspective view of an example of the conveying section.
Figure 13:
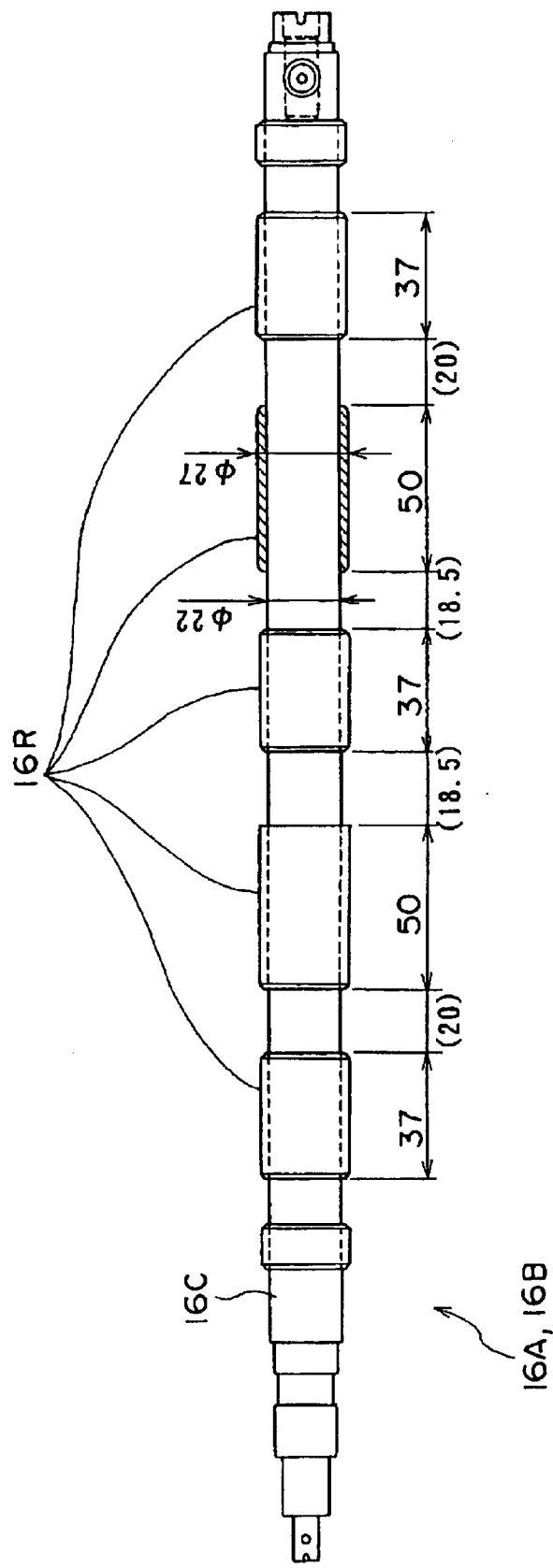
FIG. 13 is an overall side view of a driving roller unit.
Figure 14:
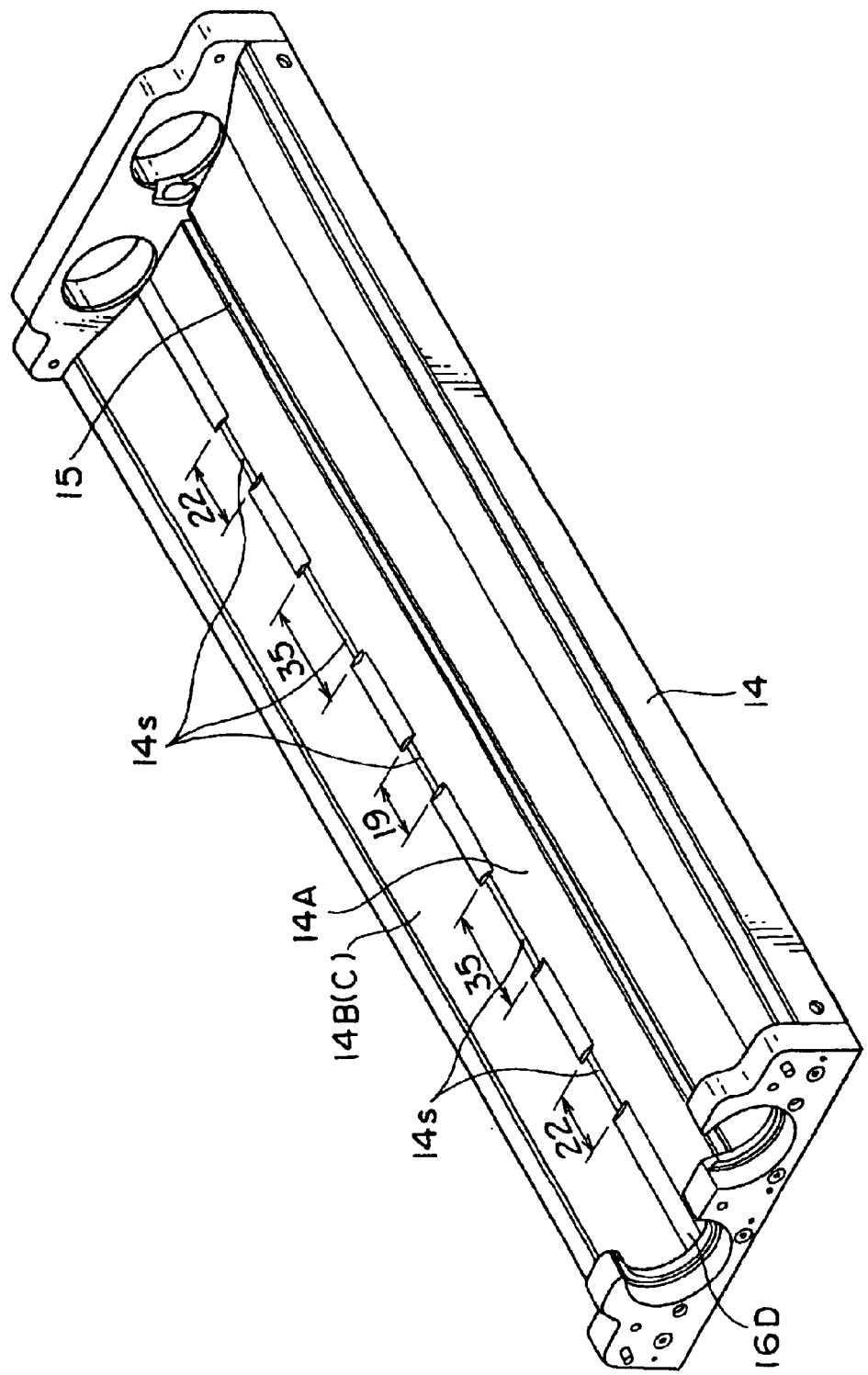
FIG. 14 is an overall perspective view of a guide plate.

With reference to FIGS. 12 through 14, an example of the concrete structure of the conveying section 10 which can be utilized in the above-described first, second and third embodiments, will be described in detail hereinafter.

As described above, the conveying section 10 is formed by the guide plate 14 along which the recording material 12 slides while contacting the guide plate 14, and the two driving rollers 16A and 16B which substantially oppose the border portions (the bent portions 14D) of the horizontal surface 14A and the slopes 14B of the guide plate 14. The driving rollers 16A and 16B are rotatably supported by the both side portions of the guide plate 14.

As shown in FIG. 13, each of the driving rollers 16A and 16B has a solid cylindrical core 16C having a longitudinal axis, and a plurality of roller portions 16R (there are five rollers portions 16R in the illustrated example) which are covered with rubber and are disposed at predetermined positions in the longitudinal direction at the outer periphery of the winding core 16C. The longitudinal direction dimensions of the roller portions 16R are, for example, 37 mm, 50 mm, 37 mm, 50 mm, 37 mm. The driving rollers 16A and 16B, at which the roller portions 16R are provided at intervals in this way, are generally called skewer-type rollers.

As described above, the slit hole 15 for preventing double exposure, which extends along a direction traversing the recording material conveying direction, is formed in the substantial center of the horizontal surface 14A of the guide plate 14. Further, a plurality of grooves 14S, which are substantially parallel to the slit hole 15, are formed at each of the two bent portions 14D. The grooves 14S, which are provided at each bent portion 14D, are positioned at positions corresponding to the roller portions 16R of the corresponding driving roller 16A or 16B, and the longitudinal direction dimensions thereof are, for example, 22 mm, 35 mm, 19 mm, 35 mm, 22 mm. Comparing the longitudinal direction dimensions of the grooves 14S and the longitudinal direction dimensions of the roller portions 16R, the longitudinal direction dimension of the roller portion 16R is always greater than that of the corresponding groove 14S.

Finally, a modified example of the conveying section will be briefly described with reference to FIG. 15.

Figure 15:
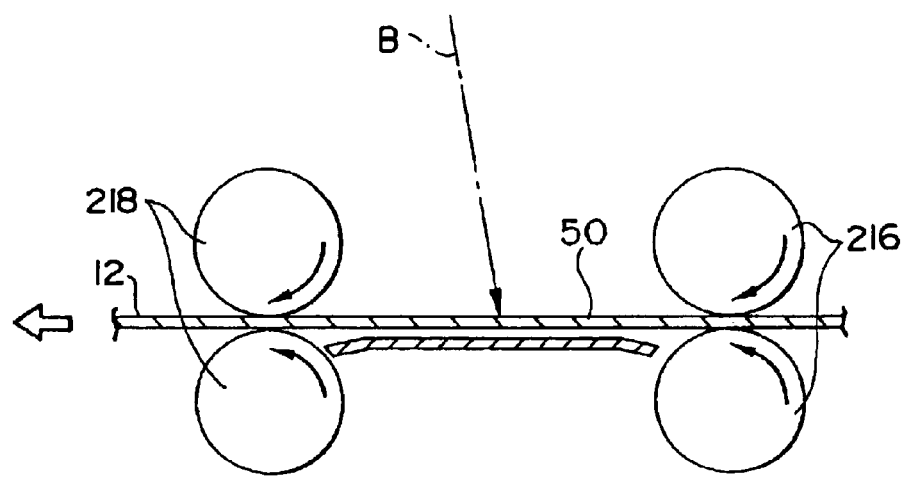
FIG. 15 is a schematic structural view of a modified example of the conveying section.

The conveying section illustrated in FIG. 15 is substantially structured by two pairs of driving rollers 216, 218.

Each roller of one or both of the roller pairs can move away from and can nip the sheet-shaped recording material 12. Each roller may be structured so as to continuously contact the recording material along a line parallel to the axial direction of the roller. Or, the rollers may have the above-described skewer-type roller structure.

What is claimed is:

1. An image forming device comprising:
   an exposure section having a laser irradiating device which irradiates and scans, on a sheet-shaped recording material, laser light which has been modulated on the basis of image data, and an exposing/conveying device for conveying the recording material, and scanning by the laser irradiating device is main scanning and conveying by the exposing/conveying device is subscanning, and the exposure section records an image by the main scanning and the subscanning;
   a heat developing section having an insertion portion, and conveying and heat developing the recording material on which an image has been formed, and
   wherein a path length between a scanning position and the insertion portion is shorter than a conveying direction length of the recording material, and
   wherein given that a conveying speed in the exposure section is V1 and a conveying speed in the heat developing section is V2, a relationship $0.7 < V2/V1 \leq 1.0$ is satisfied.

2. The image forming device according to claim 1, wherein, while an image is being recorded on one recording material in the exposure section, a leading end portion of the same recording material is inserted into the insertion portion of the heat developing section.

3. The image forming device according to claim 2, wherein the exposing/conveying device has a guide plate disposed at one side of a recording material path, and two driving rollers disposed at another side of the recording material path, axes of the driving rollers being substantially parallel to the recording material path and substantially orthogonally intersecting a conveying direction.

4. The image forming device according to claim 3, wherein the guide plate has an intermediate planar portion which is substantially parallel to the recording material path, and inclined portions at both sides of the planar portion, and each inclined portion forms a predetermined angle θ with respect to the planar portion, and each of the driving rollers opposes a corresponding inclined portion.

5. The image forming device according to claim 4, wherein the angle θ is $0 < \theta \leq 45°$.

6. The image forming device according to claim 4, wherein linear portions of connection between the planar portion and the inclined portions are formed to have rounded cross-sectional configurations, and a radius R of the portions of connection and a diameter Φ of the driving rollers satisfies a relationship $1 \text{ mm} \leq R \leq \Phi$.

7. The image forming device according to claim 3, wherein a coefficient of friction of the driving rollers is greater than a coefficient of friction of a surface of the guide plate which surface contacts the recording material.

8. The image forming device according to claim 3, wherein the driving rollers are skewer type rollers.

9. The image forming device according to claim 8, wherein linear portions of connection between the planar portion and the inclined portions have grooves at positions corresponding to at least one roller forming the skewer type rollers.

10. The image forming device according to claim 2, wherein the exposing/conveying device has two pairs of rollers.

11. The image forming device according to claim 10, wherein at least one pair of the two pairs of rollers is able to move away from and able to nip the recording material.

12. The image forming device according to claim 1, wherein the exposing/conveying device has a guide plate disposed at one side of a recording material path, and two driving rollers disposed at another side of the recording material path, axes of the driving rollers being substantially parallel to the recording material path and substantially orthogonally intersecting a conveying direction.

13. The image forming device according to claim 12, wherein the guide plate has an intermediate planar portion which is substantially parallel to the recording material path, and inclined portions at both sides of the planar portion, and each inclined portion forms a predetermined angle $\theta$ with respect to the planar portion, and each of the driving rollers opposes a corresponding inclined portion.

14. The image forming device according to claim 13, wherein the angle $\theta$ is $0 < \theta \leq 45°$.

15. The image forming device according to claim 13, wherein linear portions of connection between the planar portion and the inclined portions are formed to have rounded cross-sectional configurations, and a radius R of the portions of connection and a diameter $\Phi$ of the driving rollers satisfies a relationship $1\ mm \leq R \leq \Phi$.

16. The image forming device according to claim 12, wherein a coefficient of friction of the driving rollers is greater than a coefficient of friction of a surface of the guide plate which surface contacts the recording material.

17. The image forming device according to claim 12, wherein the driving rollers are skewer type rollers.

18. The image forming device according to claim 17, wherein linear portions of connection between the planar portion and the inclined portions have grooves at positions corresponding to at least one roller forming the skewer type rollers.

19. The image forming device according to claim 1, wherein the exposing/conveying device has two pairs of rollers.

20. The image forming device according to claim 19, wherein at least one pair of the two pairs of rollers is able to move away from and able to nip the recording material.

\* \* \* \* \*